US012536079B2

(12) United States Patent
Richard et al.

(10) Patent No.: US 12,536,079 B2
(45) Date of Patent: Jan. 27, 2026

(54) SYSTEM FOR TESTING DEVICE UNDER TEST USING REMOTE DATA CENTER

(71) Applicant: Keysight Technologies, Inc., Santa Rosa, CA (US)

(72) Inventors: Jared Richard, Fort Collins, CO (US); Chris R. Jacobsen, Loveland, CO (US); Gregory S. Hill, Santa Rosa, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 50 days.

(21) Appl. No.: 18/098,495

(22) Filed: Jan. 18, 2023

(65) Prior Publication Data
US 2024/0220380 A1 Jul. 4, 2024

Related U.S. Application Data

(60) Provisional application No. 63/436,237, filed on Dec. 30, 2022.

(51) Int. Cl.
*G06F 11/00* (2006.01)
*G06F 11/22* (2006.01)

(52) U.S. Cl.
CPC ...... *G06F 11/2221* (2013.01); *G06F 11/2294* (2013.01)

(58) Field of Classification Search
CPC .......... G06F 11/2221; G06F 11/2294
See application file for complete search history.

(56) References Cited

U.S. PATENT DOCUMENTS

| | | | | |
|---|---|---|---|---|
| 7,334,178 | B1* | 2/2008 | Aulagnier | H04L 9/00 713/160 |
| 11,255,891 | B1* | 2/2022 | Crowley | G01R 29/10 |
| 12,242,842 | B2* | 3/2025 | Chinnakannan | G06F 8/65 |
| 2010/0324855 | A1* | 12/2010 | Parker | G06F 11/2294 715/700 |
| 2014/0207404 | A1* | 7/2014 | Fritzsche | G06F 8/654 702/123 |
| 2015/0293037 | A1* | 10/2015 | Deslandes | G01N 21/9501 356/237.5 |
| 2016/0321153 | A1* | 11/2016 | Zhang | G06F 11/22 |
| 2018/0364304 | A1* | 12/2018 | Rastogi | G01R 31/31704 |
| 2019/0215707 | A1* | 7/2019 | Jackson | H04B 17/29 |
| 2020/0225655 | A1 | 7/2020 | Cella et al. | |
| 2020/0313999 | A1* | 10/2020 | Lee | H04L 43/0847 |

(Continued)

*Primary Examiner* — Loan L.T. Truong

(57) ABSTRACT

A system is proved for performing testing of devices under test (DUTs). The system includes edge sensors configured to collect measurement data from and to provide stimulus data to the DUTs for performing testing of the DUTs, where each edge sensor includes a data transducer and an intelligent network interface card configured to manage a transfer of the measurement data via a high-speed data network using remote direct memory access (RDMA); and a remote data center remote from the edge sensors, where the remote data center is scalable with respect to the number of edge sensors, and is configured to communicate with the edge sensors over the high-speed data network, where communicating with the edge sensors includes at least sending control signals for controlling the testing, receiving the measurement data, and/or sending the stimulus data.

20 Claims, 4 Drawing Sheets

(56) References Cited

U.S. PATENT DOCUMENTS

| | | | |
|---|---|---|---|
| 2021/0011823 A1 | 1/2021 | Guim Bernat et al. | |
| 2021/0303430 A1* | 9/2021 | Yuan | G06F 13/1668 |
| 2022/0018896 A1* | 1/2022 | Case | G01R 31/31932 |
| 2022/0027208 A1 | 1/2022 | Kong et al. | |
| 2022/0291278 A1* | 9/2022 | Sobolewski | G01R 31/2621 |
| 2022/0417117 A1* | 12/2022 | Tayeb | H04L 41/28 |
| 2023/0236943 A1* | 7/2023 | Anurag | G06F 11/27 |
| | | | 714/30 |
| 2023/0393168 A1* | 12/2023 | Wellig | H02J 50/00 |
| 2024/0019490 A1* | 1/2024 | Robertson | G01R 31/3185 |
| 2024/0061757 A1* | 2/2024 | Hons | G06F 11/273 |
| 2024/0094273 A1* | 3/2024 | Guo | H01J 37/32917 |

* cited by examiner

SYSTEM FOR TESTING DEVICE UNDER TEST USING REMOTE DATA CENTER

CROSS-REFERENCE TO RELATED APPLICATIONS

This present application claims priority under 35 U.S.C. § 119(e) from U.S. Provisional Application 63/436,237 filed on Dec. 30, 2022. The entire disclosure of U.S. Provisional Application 63/436,237 is specifically incorporated herein by reference.

BACKGROUND

Modern electronic devices are highly complex, and therefore testing of the electronic devices typically requires use of multiple test and measurement (T&M) instruments, including hardware and software. Historically, T&M instruments have deployed proprietary interconnects having unique electrical signaling and communications protocols for connecting electronic assemblies within a single T&M instrument and to provide interconnectivity with other systems, such as other T&M instruments, host computers, network and cloud infrastructures, storage, and compute accelerators, for example. The proprietary interconnects were developed to achieve specific test and measurement goals, such as low latency and high bandwidth, that otherwise could not be achieved using ubiquitous industry standard technologies of the time.

With each generation of T&M instruments, new proprietary protocols are developed, making interoperability and backward compatibility difficult or impossible. Some protocols utilize direct memory access (DMA) to enable low latency and high bandwidth communications for T&M instruments. However, DMA technology has been deployed non-uniformly and without an overarching framework to allow interoperability between systems.

Users continue to demand high-performance data transfer to and from T&M instruments, interconnectivity to existing high-performance networked devices (e.g., servers, storage servers, cloud infrastructure), and a broader ecosystem compatible with existing software frameworks. Conventional fragmented approaches to interconnectivity of conventional T&M instruments make it increasingly difficult to meet these demands. Also, conventional architectures provide implementations that are difficult to upgrade, do not scale efficiently, and have analog measurement circuitry that is not optimally close to the devices under test (DUTs).

Peripheral component interconnect express (PCIe) protocol has been used widely as a controlled bus for intra-instrument connectivity for a number of years, although the PCIe protocol has become prominent as a T&M instrument interface for only about the past ten years. PCIe has been utilized with custom software frameworks, where each connected device is unique or vendor specific. The lack of common software supporting PCIe-connected devices has made interoperability with mixed-vendor solutions difficult. Some newer T&M instruments implement peer-to-peer (P2P) protocols, according to which data may be transferred between two PCIe devices without intervention by the central processing units (CPUs). However, P2P protocols are vendor-specific and limited to PCIe-connected T&M instruments for inter-instrument connectivity, rather than assembling a series of devices to create an instrument solution of interconnected devices. The vendor-specific nature of P2P protocols thwarts the possibility of building measurement systems with multi-vendor heterogeneous data processors and data storage devices.

Due to the proprietary and closed nature of conventional T&M instrument designs and connectivity, disaggregation of T&M instrument hardware is difficult or impossible. Further, data mining of large amounts of collected data, as well as monetization of the mined data, is difficult or impossible without the ability to perform large data collection from interconnected devices or the cloud.

SUMMARY

According to a representative embodiment, a system is provided for performing testing of multiple devices under test (DUTs). The system includes multiple edge sensor configured to collect measurement data from the DUTs for performing testing of the DUT, where each edge sensor includes a data transducer and an intelligent network interface card configured to manage a transfer of the measurement data via a high-speed data network using remote direct memory access (RDMA); and a data center remote from the edge sensors, where the data center is scalable with respect to the number of edge sensors, and is configured to communicate with the edge sensors over the high-speed data network. Communicating with the edge sensors includes at least sending control signals for controlling the testing of the DUT and/or receiving the measurement data.

According to a representative embodiment, a system is provided for performing testing of a DUT. The system includes an edge sensor configured to collect measurement data from the DUT and/or to send stimulus data to the DUT for testing the DUT, where the edge sensor includes a data transducer configured to convert the measurement data and the stimulus data between digital and analog domains, respectively, and an intelligent network interface card configured to perform a minimum amount of processing of the measurement data and the stimulus data for communicating the measurement data and the stimulus data via a high-speed data network using RDMA; and a remote data center configured to communicate with the edge sensor over the high-speed data network, where communicating with the edge sensor includes sending control signals for controlling the testing and receiving the measurement data and/or sending the stimulus data via the high-speed data network.

According to a representative embodiment, a method is provided for performing testing of at least one DUT using remote data processing. The method includes sending control signals to at least one edge sensor from a remote data center, where the control signals control testing of the at least one DUT by the at least one edge sensor, where the remote data center is scalable with respect to a number of edge sensors of the at least one edge sensor; sending stimulus data from the remote data center to the at least one edge sensor via a high-speed data network using RDMA, where the stimulus data causes the at least one edge sensor to send a stimulus signal to the at least one DUT; receiving measurement data from the at least one edge sensor at the remote data center via the high-speed data network using RDMA, where the measurement data is collected by the at least one edge sensor from the at least one DUT in response to the control signals and/or the stimulus data; performing data processing on the received measurement data at the remote data center to determine results of the testing; and storing the processed measurement data and the determined results in a searchable database to enable data collection and data mining, where the at least one edge sensor includes a data transducer and an intelligent network interface card configured to manage a transfer of the measurement data and the stimulus data via the high-speed data network.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
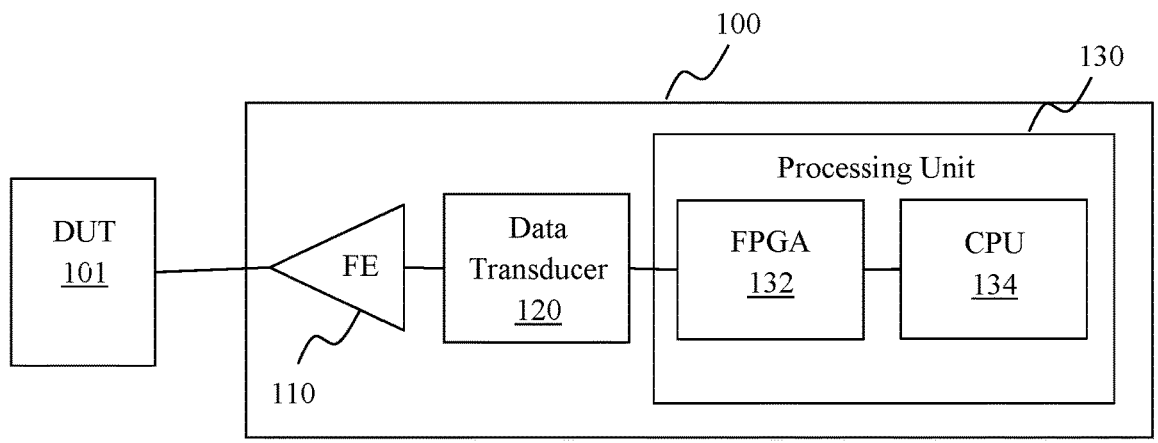
FIG. 1 is a simplified block diagram illustrating a conventional "box" T&M instrument for performing testing of one or more DUTs.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

According to various embodiments described herein, processing, visualization, and support components of T&M instruments are provided outside of the physical devices, enabling hardware disaggregation for disaggregated testing solutions, discussed below. Accordingly, the cost and size of conventional "box" T&M instruments are decreased, and core functionality may be consolidated into edge sensors at the location of the device under test (DUT). In other words, intensive processing loads are moved out of the individual physical T&M instruments into a scalable, remote data center, which may be in a workstation, an instrument, a computer client, a server, a storage server, a network server, or a cloud server in a cloud infrastructure, for example. The embodiments incorporate use of an intelligent network interface card (NIC) to perform preprocessing of measurement data and manage transfer of the measurement data to the data center via an industry-standard high-speed network, such as ethernet, for example.

FIG. 1 is a simplified block diagram illustrating a conventional "box" T&M instrument in a test and measurement environment for testing one or more DUTs. Referring to FIG. 1, T&M instrument 100 is configured to receive and process measurement signals from DUT 101, and includes front-end 110, data transducer 120, and processing unit 130. The T&M instrument 100 may be any type of test and measurement equipment that includes data processing functionality, such as an oscilloscope, a vector network analyzer (VNA), or a spectrum analyzer, for example.

The front-end 110 includes signal conditioning circuitry, such as amplifiers and/or filters, for example. The front-end 110 is configured to receive and condition the measurement signals from the DUT 101. The data transducer 120 includes initial data processing or preprocessing circuitry, such as an analog to digital converter (ADC) for converting analog measurement signals received from the DUT 101 to corresponding digital measurement data and/or a digital to analog converter (DAC) for converting digital stimulus data received from the processing unit 130 to analog signals to be transmitted to the DUT 101. The data transducer 120 may further include a multiplexer and/or demultiplexer and/or a phase shifter, for example.

The processing unit 130 is configured to perform signal processing and analysis of the digital measurement data output from the data transducer 120 and/or the stimulus data input to the data transducer 120. In the depicted illustrative configuration, the processing unit 130 includes, for example, field programmable gate array (FPGA) 132 and central processing unit (CPU) 134 for purposes of illustration, although additional data processing capability may be included, such as one or more memories for storing software instructions and/or data used by the CPU 134, for example, to process and analyze the measurement and stimulus data. Another example is a graphics processing unit (GPU) that can support the processing of data alongside the CPU 134. The T&M instrument 100 may also include one or more interfaces (not shown) configured to send processed data to networks, other T&M instruments, and/or external memories, although the actual signal processing on the digital data is performed locally by the processing unit 130, which requires significant processing power.

Figure 2:
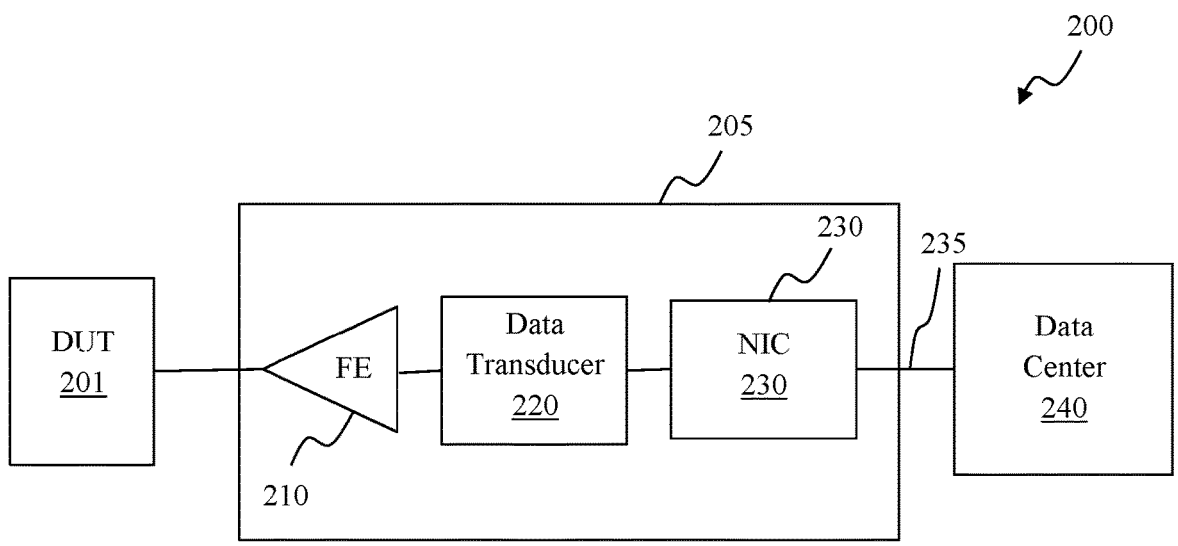
FIG. 2 is a simplified block diagram illustrating a system for performing testing of a DUT using remote data processing, according to a representative embodiment.

In comparison, FIG. 2 is a simplified block diagram illustrating a system for performing testing of a DUT using remote data processing, according to a representative embodiment. The testing may include any of various test and measurement operations, such as measuring magnitude and phase of electrical responses to input signals, measuring signal quality (e.g., signal to noise ratios), and determining scattering parameters, for example. Other test and measurement operations may include generating waveforms (sources), and receiving or sourcing digital protocol data to be decoded or sourced, for example.

Referring to FIG. 2, system 200 includes an edge sensor 205 (or instrument boundary) and a remote data center 240. The remote data center 240 is remote from the edge sensor 205 in that it is external to the edge sensor 205. That is, the remote data center 240 is a physically separate processing unit from the edge sensor 205, and therefore does not include a CPU (134) or an FPGA (132) of a T&M instrument (100), or an embedded CPU of a modular test system, for example. Accordingly, the remote data center 240 is connected to the edge sensor 205 by a network connection, indicated by high-speed data network 235, which may be an ethernet network, for example. The remote data center 240 therefore may be located in the same rack and/or room as the edge sensor 205 or in a separate building (e.g., on-premises server) or geography (e.g., cloud server).

The edge sensor 205 is configured to collect measurement data from the DUT 201 and/or to provide stimulus data to the DUT 201 for performing testing of the DUT 201. In the depicted embodiment, the edge sensor 205 includes front-end 210, data transducer 220, and intelligent network interface card (NIC) 230. The front-end 210 includes signal conditioning circuitry, such as amplifiers and/or filters, for example, and is configured to condition measurement and stimulus signals to and from the DUT 201. The data transducer 220 includes initial data processing or preprocessing circuitry for converting data between analog and digital domains. For example, the data transducer 220 may include an ADC for converting analog measurement signals received from the DUT 201 to corresponding digital measurement data and/or a DAC for converting digital stimulus data received from the intelligent NIC 230 to analog stimulus signals to be transmitted to the DUT 201. The data transducer 220 may further include a multiplexer and/or demultiplexer and/or a phase shifter, for example. In an embodiment, the edge sensor 205 may further include an FPGA (not shown) following the data transducer, which may be part of or separate from the intelligent NIC 230. The FPGA is configured to provide programmability and packet manipulation with regard to the digital measurement and stimulus data in order to provide the proper interface necessary for the intelligent NIC 230 to interface with the data transducer 220.

The intelligent NIC 230 is a programmable compute accelerator that provides a high-speed interface between the edge sensor 205 and the remote data center 240 (which likewise includes an intelligent NIC). The intelligent NIC 230 is configured to provide hardware-offload and processing of data and control traffic. That is, the intelligent NIC 230 manages the transfer of measurement and stimulus data, as well as control signaling, between the data transducer 220 and the remote data center 240 via the high-speed data network 235. The intelligent NIC 230 (and optionally the FPGA) provides a minimum amount of data processing (preprocessing), which is limited to efficiently interfacing with the data transducer 220 (e.g., including packet manipulation, data reduction to match network connection bandwidth), and enabling basic sensor control and status (e.g., including configuration of the front-end 210, synchronization, system health). That is, the minimum amount of data processing is the processing required to send and receive network data per the high-speed data network 235, and the processing required to reformat the network data and control/status information to and from the data transducer 220 and the network packets. The high-speed data network 235 may be any type of data transfer network capable of communicating data at speeds at or in excess of about 25 Gbps, for example. Such data transfer networks may include an ethernet connection, InfiniBand and Interlaken, or other wired or wireless local area network (LAN) or wide area network (WAN), for example.

In an embodiment, the intelligent NIC 230 uses a remote direct memory access (RDMA) protocol. RDMA enables direct exchange of data between memories of multiple networked systems, such as the edge sensor 205 and the remote data center 240, without reliance on the operating system of either one. In comparison, DMA enables direct exchange of data between memories of multiple directly connected systems. RDMA generally improves throughput of data by freeing up CPU resources, resulting in faster data transfer rates, higher data bandwidths, and lower latency. The intelligent NIC 230 may be a SmartNIC, available from Trenton Systems, for example, although any type of compatible high-speed, intelligent interface card or data processing unit (DPU) may be incorporated without departing from the scope of the present teachings.

The edge sensor 205 is able to provide the functionality of any type of test and measurement equipment, such as an oscilloscope, a VNA, a signal source, or a spectrum analyzer, for example. However, since the edge sensor 205 does not perform signal processing and analysis of the digital measurement data output from the data transducer 220, it does not require an on-board processing unit, such as the processing unit 130 discussed above with reference to FIG. 1.

Therefore, according to an embodiment, the edge sensor 205 may be implemented as a truncated T&M instrument that does not include a processing unit or functionality of the same. In this case, the cost and size of the edge sensor 205 may be substantially less than the cost and size of a full T&M instrument, such as the T&M instrument 100, while the speed of processing and analysis (now performed at the remote data center 240) as compared to a complete T&M instrument is scalable to the user's needs and may be significantly increased.

According to another embodiment, the intelligent NIC 230 may be added to a complete T&M instrument, such as the T&M instrument 100, by retrofitting an existing T&M instrument or by providing a new T&M instrument containing both capabilities. In this case, the processing and analysis capability of the processing unit 130 is not utilized and is otherwise by-passed with regard to the digital measurement data. Again, the processing and analysis is performed by the remote data center 240, which increases the speed of processing and analysis as compared to the complete T&M instrument since any processing limitations inherent to the processing unit 130 are avoided (and replaced with the greater speed and capabilities of the remote data center 240). Such a configuration is inherently backwards compatible.

The remote data center 240 is configured to communicate with the edge sensor 205 over the high-speed data network 235 using RDMA. Communication between the edge sensor 205 and the remote data center 240 may include sending control signals from the remote data center 240 to the edge sensor 205 for controlling the edge sensor 205 to perform testing of the DUT 201 and/or receiving the measurement data at the remote data center 240 from the edge sensor 205 for storage and/or processing and analysis. The remote data center 240 is scalable with respect to the number of edge sensors like the edge sensor 205 to which it is connected. Accordingly, the intensive processing load is moved out of the edge sensor 205 and into the scalable remote data center 240. In various embodiments, the remote data center 240 may be a computer, server, workstation, or other computational system, and may include large amounts of data storage. The remote data center 240 is considered to be "remote" from the edge sensor 205 in that it is outside of the edge sensor 205, as discussed above, and is therefore separated by a network connection. The network connection may be a direct (1 to 1) connection, a switched/routed LAN or WLAN (local) connection, an on-premises datacenter (semi-local) connection, or a cloud (distributed) connection, for example.

Segmenting the collection of measurement data from the DUT 201 and the sending of stimulus data to the DUT 201 performed by the edge sensor 205 from the processing of the measurement and stimulus data performed by the remote data center 240 may be referred to as "disaggregation." Disaggregation enables the edge sensor 205 to have reduced capabilities, since it is generally limited to measurement data collection, stimulus data transmission, and some minimum amount of processing (preprocessing). It further enables enhanced processing and centralized mass data storage by the remote data center 240 since there are fewer size and cost limitations for the remote data center 240. For example, the disaggregated testing solutions allow for test-as-a-service functionality for testing DUTs using one or more edge sensors 205 and the remote data center 240. That is, a provider of T&M instrumentation and testing services may charge customers (users) on a per measurement or per solution basis, while the customers may purchase or lease only the relatively inexpensive edge sensors 205 with minimal processing capability.

The disaggregated testing solutions also enable mass collection and storage of measurement data, especially involving cloud connections, which in turn enables data mining by the customers and/or the provider. The data mining may be performed using machine learning and artificial intelligence (AI) techniques, as would be apparent to one skilled in the art. The provider may perform data collection and/or data mining as a service upon request of the customers for a fee or on its own behalf. The data collection and data mining may be directed to collecting test results of from a large number of DUTs and tests for customers over a long period of time, for example, to enable statistical analysis of the test results. The statistical analysis may be used for specific DUT testing and manufacturing trends, or for instrument health and predictive failure/calibration needs for facility and equipment maintenance, for example. The provider may also perform data collection on its own behalf to detect and analyze strengths and weaknesses in the edge sensors 205 and test procedures. New methods of data collection and data mining may be realized using implicit or explicit cloud connectivity, for example, to further monetize the instrumentation framework. Such monetization may include licensing software for factory maintenance (calibrations) and up time (instrument sharing between product lines), instrument discovery, and software and firmware update/upgrade deployment, for example.

Figure 3:
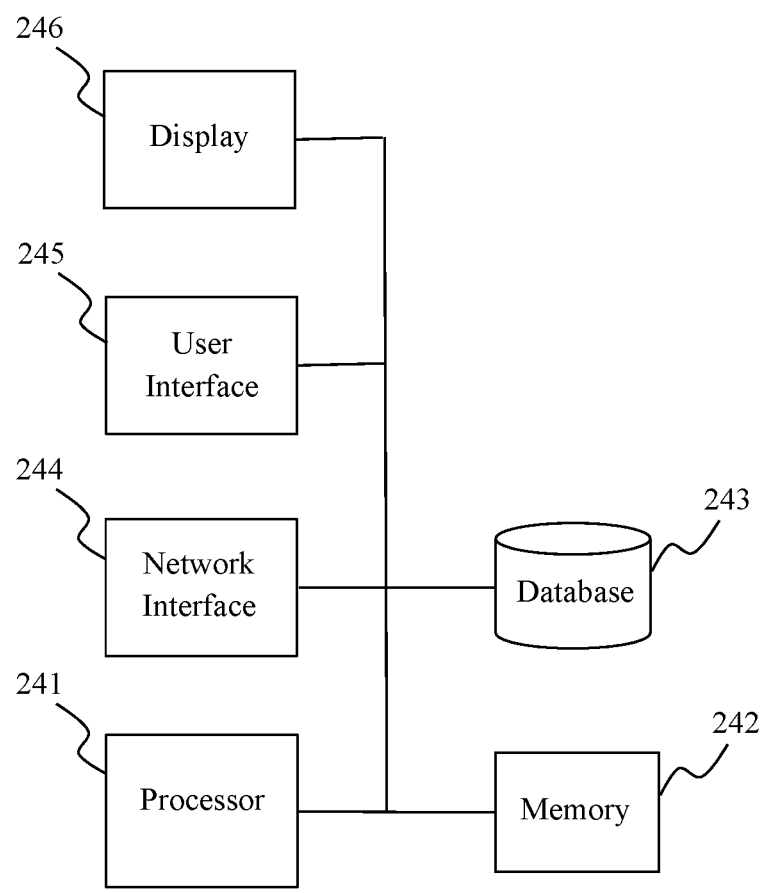
FIG. 3 is a simplified block diagram showing an example of a remote data center implemented as a computational system, according to a representative embodiment.

FIG. 3 is a simplified block diagram showing an example of the remote data center 240 implemented as a computational system, according to a representative embodiment.

Referring to FIG. 3, the remote data center 240 includes a processor 241, memory 242 for storing instructions executable by the processor 241 to implement processes including those described herein, and a database 243 for storing mass amounts of measurement data, for example. The remote data center 240 further includes a network interface 244, a user interface 245, and optionally a display 246. The processor 241 is representative of one or more processing devices and is configured to execute software instructions to perform functions as described in the various embodiments herein. The processor 241 may be implemented by a general purpose computer, a central processing unit (CPU), one or more processors, microprocessors or microcontrollers, a state machine, a programmable logic device, FPGAs, application specific integrated circuits (ASICs), GPUs, or combinations thereof, using any combination of hardware, software, firmware, hard-wired logic circuits, or combinations thereof. The term "processor" encompasses an electronic component able to execute a program or machine executable instructions, and should be interpreted to include one or more processors or processing cores, as in a multi-core processor, and/or parallel processors. A processor may also refer to a collection of processors within a single computer system or distributed among multiple computer systems, such as in a cloud-based or other multi-site application. Programs have software instructions executed by the one or multiple processors that may be within the same computing device or which may be distributed across multiple computing devices.

The memory 242 may include a main memory and/or a static memory, where such memories may communicate with each other and the processor 241 via one or more buses. The memory 242 stores instructions used to implement some or all aspects of processes described herein. The memory 242 may be implemented by any number, type and combination of random-access memory (RAM) and read-only memory (ROM), for example, and may store various types of information, such as software algorithms and computer programs, all of which are executable by the processor 241. The various types of ROM and RAM may include any number, type and combination of computer readable storage media, such as a disk drive, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), floppy disk, blu-ray disk, a universal serial bus (USB) drive, or any other form of storage medium known in the art.

The database 243 may include one or more mass storage devices, such as relational databases, for example, which may communicate with each other and the processor 241 via one or more buses. The database 243 is searchable by the processor 241 and/or corresponding database servers, and therefore may be used for data mining of measurement data, e.g., collected from edge sensors 205. The database 243 may be implemented by any number, type and combination of RAM and ROM, as discussed above with regard to the memory 242.

Each of the memory 242 and the database 243 is a tangible storage medium for storing data and/or executable software instructions, and is non-transitory during the time software instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The memory 242 and the database 243 may be secure and/or encrypted, or unsecure and/or unencrypted.

The network interface 244 is configured to interface between the remote data center 240 (e.g., the processor 241, the memory 242, and/or the database 243) and the high-speed data network 235, enabling communication between the remote data center 240 and the edge sensor 205, as described above. The network interface 244 includes an intelligent NIC compatible with the intelligent NIC 230 of the edge sensor 205. The network interface 244 may include one or more of ports, disk drives, wireless antennas, or other types of receiver circuitry, for establishing and maintaining connection with the high-speed data network 235.

The user interface 245 is configured to interface between the remote data center 240 (e.g., the processor 241, the memory 242, and/or the database 243) and a user for providing information and data output by the processor 241 the memory 242, and/or the database 243 to the user and/or for receiving information and data input by the user. That is, the user interface 245 enables the user to enter data and to control or manipulate aspects of the DUT testing and/or data mining processes discussed herein, for example, and enables the processor 241 to indicate the effects of the user's input. The user interface 245 may include one or more controls, such as a mouse, a keyboard, a trackball, a joystick, a haptic device, a microphone, a video camera, a touchpad, a touchscreen, voice or gesture recognition captured by a microphone or video camera, for example.

The display 246 may be a monitor such as a computer monitor, a television, a liquid crystal display (LCD), an organic light emitting diode (OLED), a flat panel display, a solid-state display, or a cathode ray tube (CRT) display, or an electronic whiteboard, for example. The display 246 may also provide a graphical user interface (GUI) for displaying and receiving information to and from the user. When included, the GUI is implemented with the user interface 245.

Figure 4:
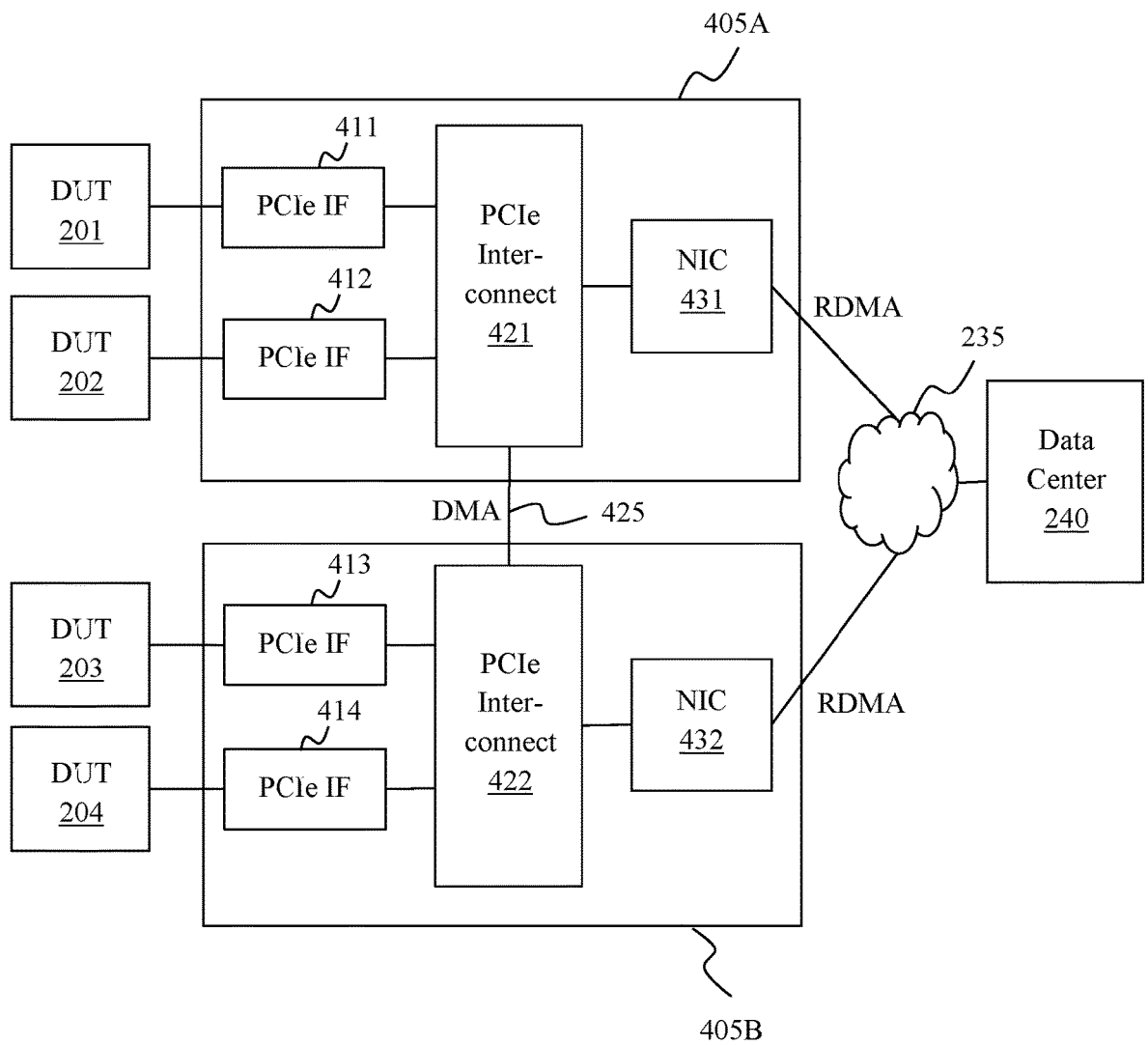
FIG. 4 is a simplified block diagram illustrating a system for performing testing of multiple DUTs using peripheral component interconnect express (PCIe) interconnects and remote data processing, according to a representative embodiment.

In an embodiment, intra-instrument connectivity (e.g., connectivity within the same instrument and direct (non-networked) connectivity between multiple instruments) leverages the PCIe protocol to connect devices within a T&M instrument, such as test, storage, computing, and networking devices. Generally, such connectivity may use DMA, for example, to enable P2P zero-copy data transfer between devices on the PCIe bus. FIG. 4 is a simplified block diagram illustrating a system for performing testing of multiple DUTs using PCIe interconnects and remote data processing, according to a representative embodiment.

Referring to FIG. 4, system 400 includes a first edge sensor 405A and a second edge sensor 405B configured to perform testing of DUTs 201, 202, 203 and 204 under control of the remote data center 240 accessible over the high-speed data network 235, as discussed above with regard to the edge sensor 205. The first edge sensor 405A includes PCIe interconnect 421, which has multiple PCIe connector interfaces, indicated by representative PCIe connector interfaces 411 and 412. The PCIe connector interfaces 411 and 412 may interface respective devices, including circuits configured for testing and measurement functionality (e.g., T&M instrumentation or circuits for performing functionality of respective T&M instruments) for testing DUTs 201 and 202. A PCIe connector interface (e.g., PCIe connector interfaces 411 and 412) may be any compatible PCIe connection, such as a PCIe card slot, a PXIe plug-in module, an Open Compute Project (OCP) NIC 3.0 module, or a custom PCIe-based interface assembly, for example. The PCIe interconnect 421 selectively connects one or both of the PCIe connector interfaces 411 and 412 to the intelligent NIC 431, which provides a high-speed interface between the first edge sensor 405A and the remote data center 240 via the high-speed data network 235 using RDMA. At least one circuit configured to provide testing and measurement functionality may be connected to at least one PCIe connector interface, respectively, and the intelligent NIC 431 may be connected to another PCIe connector interface of the PCIe connector interfaces of the PCIe interconnect 421.

Likewise, the second edge sensor 405B includes PCIe interconnect 422, which has multiple PCIe connector interfaces, indicated by representative PCIe connector interfaces 413 and 414. The PCIe connector interfaces 413 and 414 may interface respective devices, including circuits configured with testing and measurement functionality for testing DUTs 203 and 204, as discussed above. The PCIe interconnect 422 selectively connects one or both of the PCIe connector interfaces 413 and 414 to the intelligent NIC 432, which provides a high-speed interface between the second edge sensor 405B and the remote data center 240 via the high-speed data network 235 using RDMA. At least one circuit configured to provide testing and measurement functionality may be connected to a corresponding at least one PCIe connector interface, respectively, and the intelligent NIC 432 may be connected to another PCIe connector interface of the PCIe connector interfaces of the PCIe interconnect 422. One device in a PCIe connector interface of each of the first and second edge sensor 405A and 405B is an upstream device for system configuration to facilitate P2P transfers within the system 400.

In the depicted embodiment, the first edge sensor 405A and the second edge sensor 405B are also directly connected to one another through a local, low latency interconnect 425. The low level interconnect is configured to transmit low latency data between the first and second edge sensors 405A and 405B using DMA, for example. The intelligent NICs 431 and 432 in conjunction with the high-speed data network 235 provide substantially the same functionality with slightly more latency than the low latency interconnect 425. In an illustrative embodiment, the low latency interconnect 425 may include non-transparent bridging in PCIe, for example. In another illustrative embodiment, the one of the first or second edge sensors 405A and 405B may be dynamically selected, upon connection, to "own" system configuration (i.e., be the sole root complex of the bus), in which case all of the PCIe connector interfaces 411-414 may communicate directly to one another over P2P DMA and may utilize the increased bandwidth of both of the intelligent NICs 431 and 432.

The PCIe interconnects 421 and 422 connect the test and measurement circuits in the PCIe connector interfaces 411-414 to the intelligent NICs 431 and 432, respectively. The intelligent NICs 431 and 432 communicate with the remote data center 240, via the high-speed data network 235, which provides control signals to the test and measurement circuits, and sends stimulus data to the DUTs 201-204 and/or receives measurement data from the DUTs 201-204 in response to the control signals for testing the DUTs 201-204. The PCIe standard allows for flexible instrument options to match price-performance points in the market. For example, one or more of the PCIe connector interfaces 411-413 may be connected with a storage device (e.g., database 243) for users requiring deep waveform memory, may be connected with a GPU for customers requiring compute acceleration, or may be no-loaded to lower the entry point cost.

Accordingly, intra-instrument connectivity may utilize P2P low latency connections made directly between instruments via the low latency interconnect 425 with DMA. Inter-instrument connectivity may utilize the high-speed data network 235 (e.g., ethernet) to connect to any number of networked elements as the remote data center 240 with RDMA, including compute or storage servers, customer servers and networks, and cloud applications, for example. In this case, the intelligent NICs 431 and 432 enable the same P2P DMA type capabilities within an instrument to be extended to the high-speed data network 235, e.g., via RDMA over converged ethernet (RoCE), allowing consistent DMA protocols to be utilized intra-instrument or inter-instrument for data transfer and control. Utilizing the intelligent NICs 431 and 432 with RDMA capability effectively allows extension of PCIe P2P DMA operation with devices physically connected via a high-speed data network (e.g., ethernet) connection. The high-speed data network connection may be point-to-point for the highest performance and lowest latency between different devices (e.g., T&M instruments, servers, and DUTs), or may be connected into a local or remote network, for example, allowing unprecedented scaling of resources from the remote data center. The combinations of intra-instrument and inter-instrument architectures pave the way for reduction of signal processing by traditional T&M instruments to the point of becoming edge sensors themselves, as discussed above. The intelligent NICs 431 and 432 act as local hosts and data interfaces to connectivity to broader infrastructure.

The various embodiments may provide industry standard technologies that continue to scale in performance, such as bandwidth (BW) and latency, while remaining backward compatible and scalable, and utilizing common software frameworks. Such technologies may address users' performance requirements, while enabling scalability to new T&M instruments and T&M instrument functionality, as well as industry standard technologies from adjacent sectors, such as data centers, communications, high-performance computing, and the like.

Figure 5:
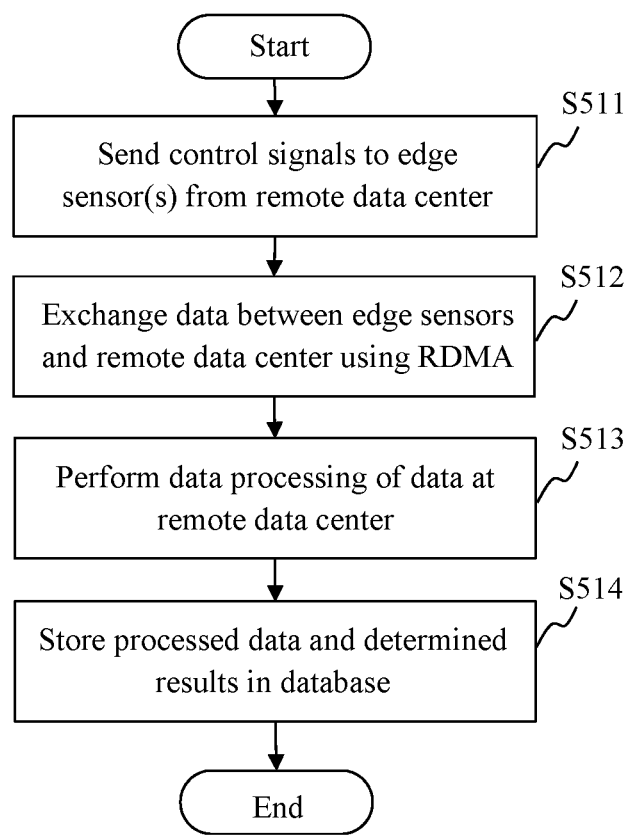
FIG. 5 is a flow diagram of a method for performing testing of DUTs using remote data processing, according to a representative embodiment.

FIG. 5 is a flow diagram of a method for performing testing of DUTs remotely, according to a representative embodiment.

Referring to FIG. 5, control signals are sent to one or more edge sensors from a remote data center via a high-speed data network in block S511. RDMA is not necessarily required for the control signals, although RDMA may be utilized when large amounts of data must be sent or low latency is required. The control signals control testing of the DUTs by the one or more edge sensors, respectively, where each of the edge sensors is configured to perform testing on each DUT. Each edge sensor includes a data transducer and an intelligent network interface card configured to perform pre-processing for matching network requirements and otherwise manage transfer of data via the high-speed data network, but does not include or is not configured to use data processing capability. The remote data center is scalable with respect to the number of edge sensors with which it can interface for performing the testing and other solution needs.

In block S512, in response to the control signals, data is exchanged between the edge sensors and the remote data center using RDMA. That is, measurement data is received from the one or more edge sensors by the remote data center and/or stimulus data is sent to the one or more edge sensors from the remote data center via the high-speed data network using RDMA. The measurement data is collected by the edge sensors from the DUTs, respectively. The stimulus data is generated by the remote data center, and is provided to the DUTs by the edge sensors, respectively.

In block S513, data processing is performed on the received measurement data at the remote data center to determine results of the testing, and/or processing is performed on generated stimulus data to be transmitted to the one or more edge sensors for stimulating the DUTs. The data processing may include waveform generation from various parameters; waveform manipulation, such as filtering, linear and non-linear corrections, resampling/interpolation, protocol encode/decode, and modulation/demodulation; measurement data search, such as spur hunting, and real-time spectrum analysis (RTSA); channelization; multi-channel analysis; and multiple-input and multiple-output (MIMO) analysis, for example, although it is understood that any type of applicable data processing may be performed by the remote data center without departing from the scope of the present disclosure. Once data is in the remote data center, the various data processing applications may be disaggregated and/or parallel processed at the most appropriate processing node on the network (e.g., visualization of RTSA in a GPU, real-time fast Fourier transform (FFT) in an FPGA, metadata creation in a CPU).

In block S514, the processed measurement data and the determined results optionally may be stored in a searchable database at the remote data center to enable mass data collection and/or data mining. The mass data collection and/or data mining may be performed using machine learning and AI techniques, for example. The provider may perform data collection and/or data mining as a service upon request of the customers for a fee. The provider may also perform data collection on its own behalf to detect and analyze strengths and weaknesses in the edge sensors and test procedures.

The various embodiments enable automation and data gathering from multiple test instruments, software applications and browser simulators. A user is able to repeatedly capture data from the automated flow or from interactions between the modes of connections. The embodiments also simplify for users the process of setting up and testing with data collection on multiple modes of connections, which are interdependent.

In accordance with various embodiments of the present disclosure, the methods described herein may be implemented using a hardware computer system that executes software programs stored on non-transitory storage mediums. Further, in an exemplary, non-limited embodiment, implementations can include distributed processing, component/object distributed processing, and parallel processing. Virtual computer system processing may implement one or more of the methods or functionalities as described herein, and a processor described herein may be used to support a virtual processing environment.

While the disclosure has been illustrated and described in detail in the drawings and foregoing description, such illustration and description are to be considered illustrative or exemplary and not restrictive; the disclosure is not limited to the disclosed embodiments. Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

The illustrations of the embodiments described herein are intended to provide a general understanding of the structure of the various embodiments. The illustrations are not intended to serve as a complete description of all of the elements and features of the disclosure described herein. Many other embodiments may be apparent to those skilled in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

Aspects of the present disclosure may be embodied as an apparatus, method or computer program product. Accordingly, aspects of the present invention may take the form of an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A system for performing testing of a plurality of devices under test (DUTs) remotely, the system comprising:
a plurality of edge sensors configured to provide functionality of test and measurement equipment for performing testing on the plurality of DUTs in response to control signals, including providing stimulus data to the plurality of DUTs and collecting measurement data from the plurality of DUTs in response to the stimulus data, wherein each edge sensor of the plurality of edge sensors is separate from the plurality of DUTs and is connectable to at least one DUT of the plurality of DUTs, and wherein each edge sensor of the plurality of edge sensors comprises a data transducer and an intelligent network interface card configured to manage transfer of the measurement data and the stimulus data via a high-speed data network using remote direct memory access (RDMA); and
a remote data center remote from the plurality of edge sensors, wherein the remote data center is scalable with respect to the number of edge sensors in the plurality of edge sensors, and is configured to provide the control signals to the plurality of edge sensors to perform the testing on the plurality of DUTs, and to send the stimulus data to and to receive the measurement data from the plurality of edge sensors over the high-speed data network and the intelligent network interface card.

2. The system of claim 1, wherein the intelligent network interface card comprises hardware-offload and pre-processing of the control signals, the measurement data and the stimulus data.

3. The system of claim 1, wherein the high-speed data network comprises an ethernet.

4. The system of claim 1, further comprising:
at least one low latency interconnect configured to transmit low latency data between edge sensors of the plurality of edge sensors using direct memory access (DMA).

5. The system of claim 4, wherein each edge sensor further comprises a peripheral component interconnect express (PCIe) interconnect and a plurality of PCIe connector interfaces connected to the PCIe interconnect, wherein at least one circuit configured to provide the functionality of the test and measurement equipment is connected to at least one corresponding PCIe connector interface, and wherein the intelligent network interface card is connected to another PCIe connector interface of the plurality of PCIe connector interfaces.

6. The system of claim 5, wherein the at least one low latency interconnect connects the PCIe interconnects of the plurality of edge sensors.

7. The system of claim 1, wherein the remote data center comprises at least one of a workstation, an instrument, a computer client, a server, a storage server, a network server, and a cloud infrastructure.

8. The system of claim 1, wherein the remote data center is further configured to store the measurement data, and to perform data mining on the stored measurement data.

9. The system of claim 1, wherein the data transducer in each edge sensor comprises an analog-to-digital converter (ADC) configured to convert the measurement data from analog to digital data, and a digital-to-analog converter (DAC) configured to convert the stimulus data from digital to analog data.

10. The system of claim 9, wherein each edge sensor of the plurality of edge sensors further comprises a field programmable gate array (FPGA) configured to provide programmability and packet manipulation with regard to the measurement data.

11. A system for performing testing of a device under test (DUT), the system comprising:
    an edge sensor configured to provide functionality of test and measurement equipment for performing testing on the DUT in response to remotely provided control signals, the functionality including sending stimulus data to the DUT for testing the DUT and collecting measurement data from the DUT in response to the stimulus data, wherein the edge sensor is separate from and connectable to the DUT, and wherein the edge sensor comprises:
        a data transducer configured to convert the stimulus data from analog to digital domains, and to convert the measurement data from digital to analog domains;
        an intelligent network interface card configured to perform a minimum amount of processing of the measurement data and the stimulus data for communicating the measurement data and the stimulus data via a high-speed data network using remote direct memory access (RDMA); and
    a remote data center configured to send the control signals for controlling the testing to the edge sensor, and to send the stimulus data and receive the measurement data to and from the edge sensor via the high-speed data network.

12. The system of claim 11, wherein the high-speed data network comprises an ethernet.

13. The system of claim 11, wherein the edge sensor further comprises:
    a peripheral component interconnect express (PCIe) interconnect and a plurality of PCIe connector interfaces connected to the PCIe interconnect, wherein at least one circuit configured to provide the functionality of the test and measurement equipment with respect to the DUT is connected to at least one corresponding PCIe connector interface, and wherein the intelligent network interface card is connected to another PCIe connector interface of the plurality of PCIe connector interfaces.

14. The system of claim 13, wherein the edge sensor further comprises:
    a low latency interconnect configured to transmit low latency data between the PCI interface and a PCI interface of another edge sensor using direct memory access (DMA).

15. The system of claim 11, wherein the data transducer comprises one or more analog-to-digital converters (ADCs) configured to convert the measurement data from analog to digital data, and one or more digital-to-analog converters (DACs) configured to convert the stimulus data from digital to analog data.

16. The system of claim 11, wherein the remote data center comprises a cloud server in a cloud infrastructure.

17. The system of claim 16, wherein the remote data center is further configured to store the measurement data, and to perform data mining on the stored measurement data.

18. The system of claim 11, wherein the remote data center is scalable with respect to a number of additional edge sensors with which it communicates.

19. A method for performing testing of a at least one device under test (DUT) using remote data processing, the method comprising:
    sending control signals to at least one edge sensor from a remote data center, wherein the control signals control testing of the at least one DUT by the at least one edge sensor, wherein the at least one edge sensor is not included in the at least one DUT and is configured to provide functionality of test and measurement equipment for performing the testing of the at least one DUT, and wherein the remote data center is scalable with respect to the number of edge sensors of the at least one edge sensor;
    sending stimulus data generated by the remote data center to the at least one edge sensor via a high-speed data network using remote direct memory access (RDMA), wherein the at least one edge sensor sends the stimulus data to the at least one DUT;
    receiving measurement data from the at least one edge sensor at the remote data center via the high-speed data network using RDMA, wherein the measurement data is collected by the at least one edge sensor from the at least one DUT in response to the control signals and the stimulus data;
    performing data processing on the received measurement data at the remote data center to determine results of the testing; and
    storing the processed measurement data and the determined results in a searchable database to enable data collection and data mining,
    wherein the at least one edge sensor comprises a data transducer and an intelligent network interface card configured to manage transfers of the measurement data and the stimulus data via the high-speed data network.

20. The system of claim 1, wherein the each edge sensor of the plurality of edge sensors further comprises a front-end configured to receive and condition the measurement data from the at least one DUT of the plurality of DUTs to which the edge sensor is connected.

\* \* \* \* \*